June 22, 1965

G. P. MALY 3,190,680

FLEXIBLE COUPLING

Filed June 6, 1960

INVENTOR.
GEORGE P. MALY
BY
ATTORNEY

June 22, 1965

G. P. MALY 3,190,680

FLEXIBLE COUPLING

Filed June 6, 1960

INVENTOR.
GEORGE P. MALY
BY
ATTORNEY

United States Patent Office

3,190,680
Patented June 22, 1965

3,190,680
FLEXIBLE COUPLING
George P. Maly, Fullerton, Calif., assignor to Union Oil Company of California, Los Angeles, Calif., a corporation of California
Filed June 6, 1960, Ser. No. 34,137
3 Claims. (Cl. 285—49)

This invention relates to a flexible coupling for tubular elements such as pipe, tubing, conduits, etc., and, in particular, relates to a flexible coupling which dampens vibrations and prevents their transmission through an assembly of tubular elements.

To dampen vibrations and prevent their transmission between adjacent tubular elements, it is essential that the elements adjacent the source of vibration be isolated by a highly resilient material which cushions or absorbs the vibrations. It has been proposed that a coupling comprising a steel spring embedded in rubber be used for this service, however this device is not entirely satisfactory since metal has a high resonant quality and the continuous spring offers a continuous helical passageway for the transmission of vibrations. Accordingly, it is desirable to eliminate metal-to-metal contact between adjacent elements by employing a highly elastic or rubberoid material to couple the elements and thereby dampen vibration. The use of such a material, however, presents a structural problem of maintaining a fluid-tight seal between the tubular elements. This problem is acute when high pressure differentials between the interior and exterior of the elements are encountered.

It is an object of this invention to provide a flexible coupling between tubular elements which is fluid-tight at high pressure differentials and which prevents the transmission of vibrations between the coupled tubular elements.

My novel flexible coupling which achieves the aforementioned objective comprises a body composed of an elastomeric material having a hollow cylindrical shape and coupled by suitable means to the adjacent tubular elements. Embedded within this body at spaced intervals along the length thereof are flat annular metal rings. Metal-to-metal contact of these rings within the elastomeric body is prevented, since each of the metal washers is encompassed by the elastomeric material. The spacing, thickness and annular surface of the washers is chosen within limits hereinafter set forth so as to maintain the seal by utilizing the adhesion and shear strength of the elastomeric material. Preferably, the coupling is designed so that the force developed by the difference in pressure between the inside and outside of the body also compresses the elastomeric material and thereby obtains the maximum shear and adhesion strength of the material. To attain maximum adhesion, the metal rings are also preferably vulcanized in place in the elastomeric body.

The elastomeric material comprising the cylindrical body can be any naturally occurring or synthetic material exhibiting elastic or rubber like properties. Suitable materials include the following:

Natural, reclaimed and vulcanized rubber and synthetic rubber substitutes produced by (a) polymerization of butadiene alone or with styrene or acrylonitrile, e.g., Ameripol, Buna, Perbunan, etc., and the nitrile rubbers, Hycar, Paracril, Butaprene, etc.; (b) interraction between sodium polysulfides and dihalides, e.g., Thiokol; (c) polymerization of chloroprene, e.g., Duprene, neoprene; (d) polymerization of isobutylene, e.g., Vistanex; (e) polymerization and plasticization of vinyl chloride, e.g., Koroseal; (f) polymerization of acrylate esters to form polyacrylate rubbers; (g) polyurethane rubbers; and (h) silicone rubbers formed by polymerization of siloxanes, e.g., dimethylsiloxane. Of the aforementioned, the neoprenes having a Shore Hardness about 40 to 90 are preferred for a specific use of the invention in subterranean oil wells where resistance to oil bearing fluids is required.

The invention will now be described in detail with reference to the figures of which:

Figures 1, 2:
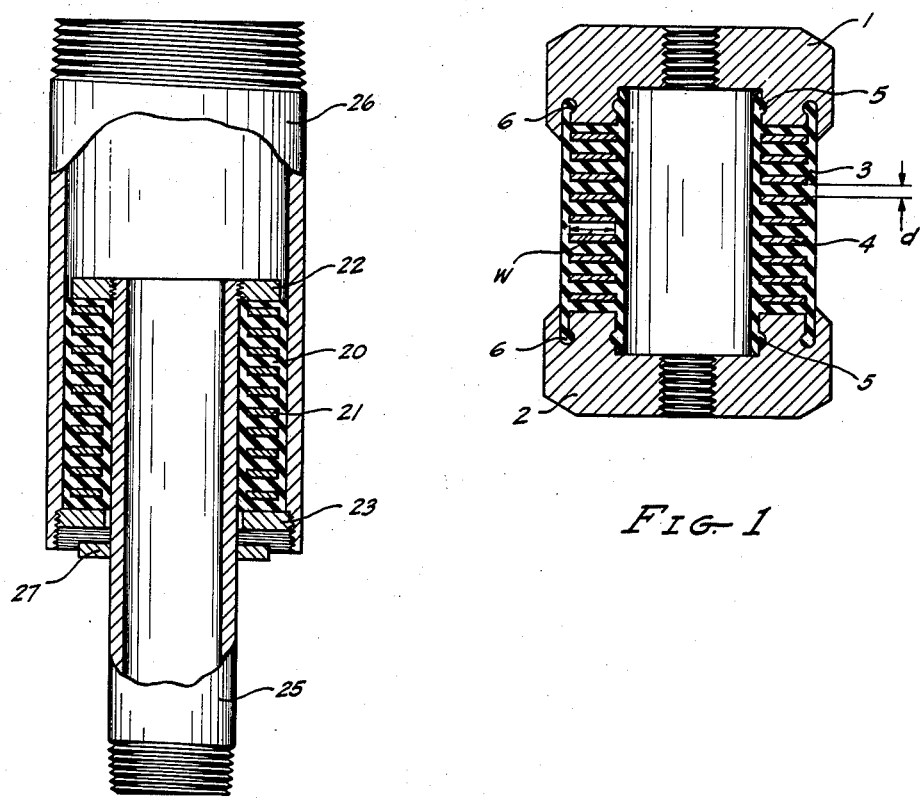
FIGURE 1 illustrates an embodiment particularly suited for use on conduits having a reduced internal pressure.
FIGURE 2 illustrates a second embodiment particularly suited for use on conduits having an elevated internal pressure.

Referring now to FIGURE 1, the invention takes the form of a first metal cap 1 and a second metal cap 2 separated by a hollow cylinder 3 composed of the elastomeric material. Caps 1 and 2 are secured to cylinder 3 by the intrusion of the elastomeric material into suitable grooves such as shown by 5 and 6 in the caps. To obtain maximum adhesion of these parts, it is preferred to vulcanize the elastomer to the mating surfaces of these caps, however the use of various conventional resin cements is also suitable for this purpose. Caps 1 and 2 are shown to be bored and tapped for insertion of the threaded ends of conduits. If desired, these taps can be of unequal diameters and the coupling thereby also functions as a reducer. Also, if desired, either cap can be threaded about its outer periphery and take the shape of a threaded flange for coupling to a union type fitting. In still other modifications, the opposite ends of cylinder 3 can be attached to tubular fittings having male threads. In any event, metal rings or washers 4 are embedded within elastomeric body 3 at spaced intervals along its length and vulcanized in place. In use, the pressure difference existing between the interior and exterior of the joint places the elastomeric material between each group of adjacent metal rings in shear and thus provides a stronger and more rigid body than possible without these metal rings. To obtain the maximum strength of the elastomeric material in this shear and adhesion load bearing relationship, it is desirable to maintain the ratio of ring spacing to ring width, $d/w$ less than about 1/4 and preferably less than about 1/10. Also, to attain maximum strength, body 3 is preferably vulcanized in place, for instance, by placing the assembly in a vulcanizing chamber for the requisite cure time and steaming or heating the assembly at vulcanization temperatures, about 250° to 350° F. Typical vulcanizing agents are incorporated into the elastomer and are, for instance, sulfur compounds, selenium, tellurium, zinc and magnesium oxides, benzoyl peroxide, etc. The cure period and temperature are, of course, dependent on the identity of the elastomer and can be greatly reduced by the inclusion of accelerators such as aldehyde amines, thiocarbamates, thiuram sulfides, guanidines, thiazoles, etc.

In its preferred use, the flexible coupling as illustrated in FIGURE 1 is employed on conduits transmitting fluids at pressures less than that surrounding the conduits. For example, the coupling can be employed on fluid power lines extending into a subterranean well where frequently the well bore pressure is about 2000 p.s.i. or greater. The pressure within the conduit can be substantially less than this pressure, e.g., about atmospheric or only slightly greater. With such pressure differentials, the elastomeric material comprising body 3 is placed in compression which can be as great as about 3000 p.s.i.

Use of metal rings 4 in body 3 imparts a greater vibration dampening characteristic to this body than that of the pure elastomeric material or metal. This greater dampening property is due to the relative speed of vibration through the elastomer and the metal rings. This can be demonstrated in reference to FIGURE 1 by imagining a vibration source attached to cap 2. These vibrations are applied to the lower portion of elastomeric body 3 and commence to travel through this body at a speed characteristic of the particular elastomeric material employed. The magnitude of these vibrations are greatly diminished in the lowermost portion of body 3 because of the elastic dampening characteristics of the elastomer. Some vibration, however, is passed to the undersurface of the lowermost metal ring and is transmitted therethrough at a much greater velocity than through the surrounding elastomeric material. The effect of this is to cause the metal ring and the surrounding elastomer to vibrate out of phase and against each other causing the vibrations to cancel out. This effect is repeated at each of the metal rings so that virtually no vibrations are transmitted through the coupling.

Referring now to FIGURE 2, there is illustrated a second form of my flexible coupling composed of threaded tubular elements and suitable for use when the pressure inside the conduit exceeds the exterior pressure. As illustrated, the invention takes the form of a main annular body 20 composed of flat metal rings 21 which are embedded in an elastomeric material in a manner similar to that previously discussed in conjunction with FIGURE 1. Body 20 is compressed between ring 22 and retaining ring 23 which are attached, respectively, to tubular elements 25 and 26 in any suitable manner such as by welding, threaded fitting, etc. To prevent vibrations from passing between ring 22 and retaining ring 23, these elements are maintained out of contact with the opposite tubular element. The axial movement of element 26 relative to 25 is limited by flange 27 which is secured as shown to element 26 by any suitable means, swedged fit, welding, threads, etc. Preferably, to attain maximum adhesion of the elastomeric material to the metal surfaces, the entire joint is assembled and then vulcanized by any conventional means such as those previously described. After vulcanization, the assembled joint is ready for use, preferably to conduct fluids which are under a greater pressure than the surrounding pressure so as to place the elastomer of body 20 in compression. Vibration is prevented from passing between conduits 25 and 26 because of the vibration dampening qualities of body 20, which is enhanced by the embedded metal rings in the manner previously described in reference to FIGURE 1.

Figure 3:
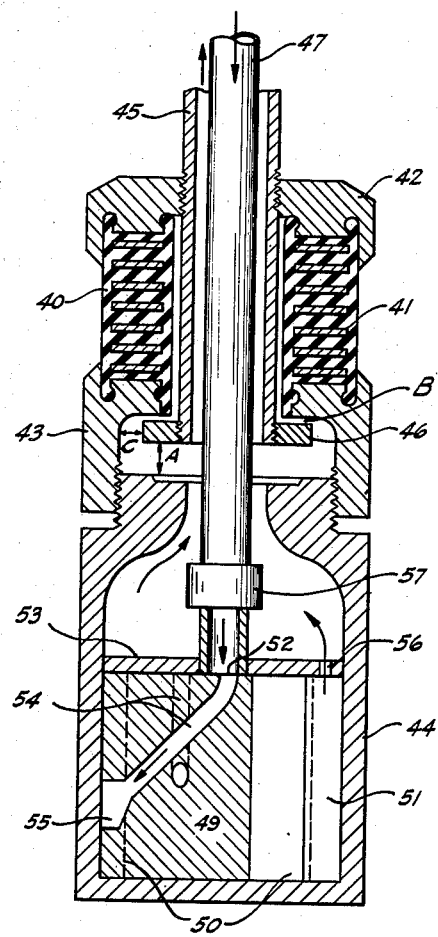
FIGURE 3 illustrates a specific embodiment of my invention adapted for use in a subterranean well.

Referring now to FIGURE 3, there is illustrated a form of the coupling illustrated in FIGURE 1 adapted for coupling the supply and exhaust lines of a power fluid to a vibrator to be positioned within a subterranean well bore. A preferred vibrator is that disclosed by George L. Malan in U.S. Patent Nos. 2,187,088; 2,743,090 and 2,891,775 in which a fluid under pressure, e.g., air, drives a rotor in an eccentric path around a cylindrical race. This device produces a vibrational field having a frequency between about 50 to 300 cycles per second and an amplitude between about 1.0 to .01 inch for power inputs between about 10 to 100 horsepower. The vibrational field establishes circulatory motion in the surrounding solids or fluids and aids in the treatment of the well. My invention is employed between the vibrator and the power fluid conduits to isolate the vibrations and prevent their transmission up the power fluid conduits. As illustrated, an elastomeric body 40 containing flat annular metal rings 41 is attached at its opposite ends to plate 42 and the flat radial surface of cap 43. Cap 43 is threaded about its lower interior peripheral surface for attachment to the vibrator housing 44. Eccentrically positioned within housing 44 is rotor 49. Three longitudinal slots 50 in housing 44 is rotor 49. Three longitudinal slots 50 in rotor 49 into which are symmetrically arranged about rotor 49 into which are fitted vanes 51. These vanes serve to divide the crescent shaped zone between the eccentrically positioned rotor and the housing into 3 chambers. Three air supply ports 52 (only 2 are shown) serve to supply air from the central port in rotor housing plate 53 through the rotor body via pasageways 54 to discharge ports 55. Plate 53 is attached to supply air line 47 by resilient coupling 57. The air pressure acting on the housing wall at port 55 causes eccentric rotor 49 to move away from the wall and to move its associated air port 52 away from the central air inlet. As the rotor moves, it creates a space between its wall and the housing. Continued movement of the rotor opens this space to an exhaust port such as shown at 56, permitting the air to be exhausted into conduit 45. Sequentially, each of the air inlet ports 52 are moved into position beneath the air inlet port causing the rotor to be continually driven about the housing in an eccentric manner. A more complete description of this device and its opeartion can be found in the aforementioned patents to George L. Malan. Plate 42 is bored and threaded for attachment to conduit 45 which has an elongated small diameter end. When assembled, the elongated end of conduit 45 extends through annular body 40, cap 43, and terminates beneath cap 43 where it is threaded into ring 46, which limits the relative axial movement of conduit 45 and thereby prevents the accidental destruction of the coupling when the assembly is being raised and lowered in the well bore. Concentrically disposed within conduit 45 is a second conduit 47. When in use, power fluid is supplied through this conduit 47 and the exhaust from the vibrator is removed through the annular space between conduit 47 and conduit 45. The construction of annular body 40 containing rings 41 is the same as previously described in reference to FIGURE 1. When the coupling is assembled, care is taken to isolate plate 46 and conduit 45 from contact with cap 43 and the upper shoulders of housing 44. Allowance should be made between the lower surface of plate 46 and the upper shoulder of the vibrator to prevent their contacting when the joint is compressed in use. This is readily accomplished by maintaining the distance between these surfaces, A, at least as great as the maximum expected strain of body 40. The magnitude of the spacing between other adjacent metal surface, e.g., B and C, depends on the maximum amplitude of vibration, but preferably is at least about 1/32 to 1/8 inch; suitable for most applications with the aforedescribed vibrator.

When in use, the vibrator is attached to conduit 45 with the flexible coupling as illustrated and conduit 45 is in turn connected by suitable means to a tubing string which is run down the bore hole until the vibrator is opposite the interval to be treated. Second conduit 47 is then run down the tubing string, through conduit 45 and attached to the vibrator. In use, power fluid, e.g., compressed air at about 2 to 200 atmospheres pressure is forced down central tubing 47 into the vibrator and exhausted up the annulus between second conduit 47 and conduit 45. The pressure surrounding the vibrator normally varies between about 500 and 4500 p.s.i., depending on the depth to which the vibrator is lowered in the well bore. This high exterior pressure compresses the assembly and places the elastomeric material between the metal surfaces in shear and in compression. Under this compression, ring 46 is displaced slightly towards the upper shoulder of the vibrator, however, this movement is less than distance A and insufficient to cause contacting of the proximate metal surfaces. In this manner the vibrations are essentially isolated from the supporting tubing assembly.

Other modes of applying the principle of my invention can be employed other than those explained and illustrated, e.g., elements of non-circular cross-section such as square, elliptical, etc., can be used, and changes can be made as regards the materials employed, provided the apparatus stated by any of the following claims or the equivalents thereof be used.

I claim:
1. A flexible, vibration dampening coupling for attaching fluid supply and exhaust conduits employed at lesser internal than external pressures to a fluid actuated vibrator comprising: a hollow cylindrical body attached only at its opposite ends to a metal plate and the radial surface of a metal cap, the outer cylindrical surface of said body being out of contact with said plate and said cap and being exposed to said external pressure, said body comprised of an elastomeric material and comprising the sole structural linkage between said plate and said cap, a plurality of metal rings embedded within said body at spaced intervals along its length so as to isolate said rings from each other and from metal contact with said conduits, a first conduit attached to and extending through a centrally disposed bore in said plate, the hollow interior of said body and a central bore in the radial portion of said cap, said conduit terminating a substantial distance within the interior of said cap, a ring attached to the lower end of said first conduit, said ring being of lesser diameter than said interior diameter of said cap, said conduit and said ring being out of contact with said cap, said cap threaded about its lower interior periphery for connection to the housing of said vibrator and a second conduit concentrically extending through said first conduit to said vibrator.

2. The apparatus of claim 1 wherein said body is attached to said plate and said cap by intrusions of said elastomeric material into circular grooves about the peripheries of said plate and cap and about the peripheries of said central bores in said plate and cap.

3. The apparatus of claim 1 in combination with a fluid actuated vibrator comprising a cylindrical rotor body eccentrically disposed within said housing, a circular plate positioned within said housing having a central port communicating with said second conduit and a plurality of radially disposed exhaust ports, said rotor having a plurality of fluid passageways extending from inlet ports symmetrically disposed about the upper radial surface of said rotor to discharge ports symmetrically disposed about the peripheral surface of said rotor, said inlet ports, fluid passageways and discharge ports adapted to cause eccentric rotation of said rotor.

References Cited by the Examiner

UNITED STATES PATENTS

| | | | |
|---|---|---|---|
| 2,075,093 | 3/37 | Cannon | 259—1 |
| 2,187,088 | 1/40 | Malan | 259—1 |
| 2,232,842 | 2/41 | Douglass | 259—1 |
| 2,267,085 | 12/41 | Dezendorf | 285—49 |
| 2,504,634 | 4/50 | Boschi | 285—223 |
| 2,536,216 | 1/51 | Powell | 285—235 |
| 2,743,090 | 4/56 | Malan | 259—1 |
| 2,891,775 | 6/59 | Malan | 259—1 |
| 2,950,129 | 8/60 | Schaefer | 285—49 |
| 2,977,919 | 4/61 | Blake | 285—49 |

FOREIGN PATENTS

| | | |
|---|---|---|
| 701,978 | 1/41 | Germany. |
| 830,272 | 2/52 | Germany. |
| 586,888 | 4/47 | Great Britain. |

CARL W. TOMLIN, *Primary Examiner.*